(12) United States Patent
Raley et al.

(10) Patent No.: US 8,714,580 B2
(45) Date of Patent: May 6, 2014

(54) KIT FOR PROVIDING WHEELED APPARATUS HAVING MULTIPLE WHEELBASE USE CONFIGURATIONS

(71) Applicants: Jefferson W. Raley, Austin, TX (US); Philippe P. Nassaux, Austin, TX (US)

(72) Inventors: Jefferson W. Raley, Austin, TX (US); Philippe P. Nassaux, Austin, TX (US)

( * ) Notice: Subject to any disclaimer, the term of this patent is extended or adjusted under 35 U.S.C. 154(b) by 0 days.

(21) Appl. No.: 13/757,770

(22) Filed: Feb. 2, 2013

(65) Prior Publication Data

US 2013/0168948 A1   Jul. 4, 2013

Related U.S. Application Data

(63) Continuation-in-part of application No. 12/799,156, filed on Apr. 20, 2010, now Pat. No. 8,413,999.

(60) Provisional application No. 61/171,698, filed on Apr. 22, 2009.

(51) Int. Cl.
    *B62B 1/00*    (2006.01)
(52) U.S. Cl.
    USPC .................. 280/638; 280/47.131; 280/47.18; 280/47.19; 280/652

(58) Field of Classification Search
    USPC ........... D34/24–26; 414/490; 248/125.8, 129, 248/139; 403/187, 188, 346, 396
    See application file for complete search history.

(56) References Cited

U.S. PATENT DOCUMENTS 5,160,153 A * 11/1992 Zan .............................. 280/43.1

* cited by examiner

*Primary Examiner* — John Walters
*Assistant Examiner* — James Triggs
(74) *Attorney, Agent, or Firm* — David O. Simmons

(57) ABSTRACT

A kit for modifying a wheeled apparatus comprises a set of caster unit mounts, a set of caster units, a subframe mounting structure, and a subframe. Each caster unit mount has a caster unit mounting structure and a main frame engaging structure attached to the caster unit mounting structure. The main frame engaging structure is attachable to a main frame and/or a load support structure of the wheeled apparatus. Each caster unit has a mounting portion configured for being secured to the caster unit mounting structure of a respective caster unit mount such that a first-size wheel thereof can rotate about of a rotational axis thereof and pivot about a pivot axis thereof. The subframe mounting structure, which is attachable to the main frame, has a first end portion pivotably attached to the subframe mounting structure and a second end portion having a second size wheel mounting structure integral therewith.

18 Claims, 8 Drawing Sheets

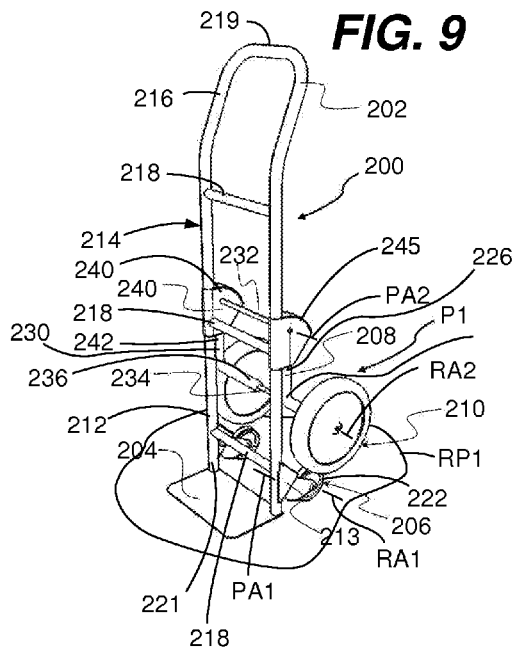
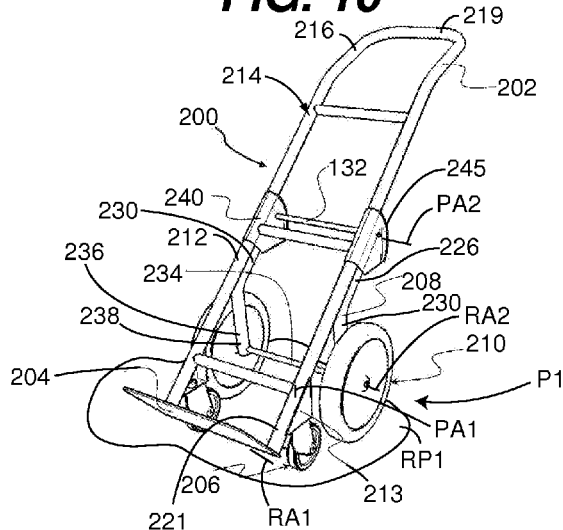
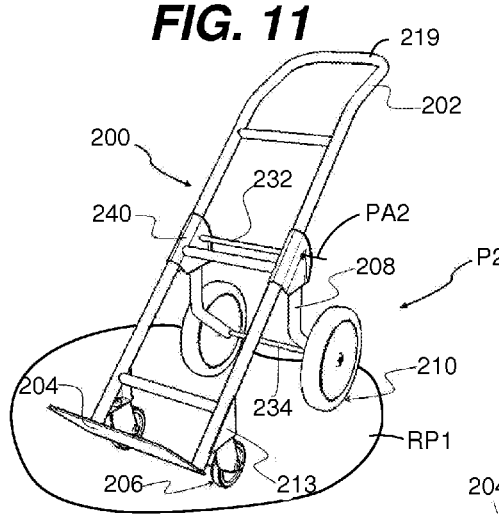
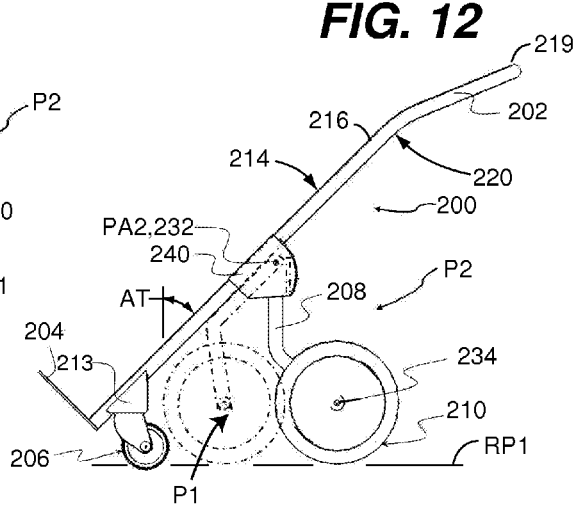

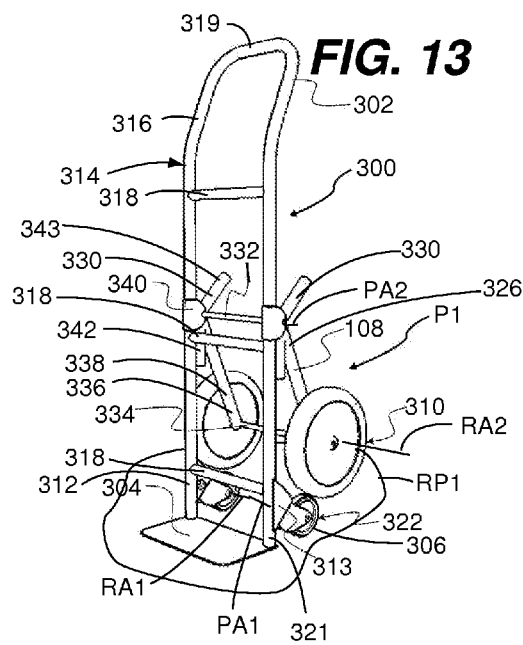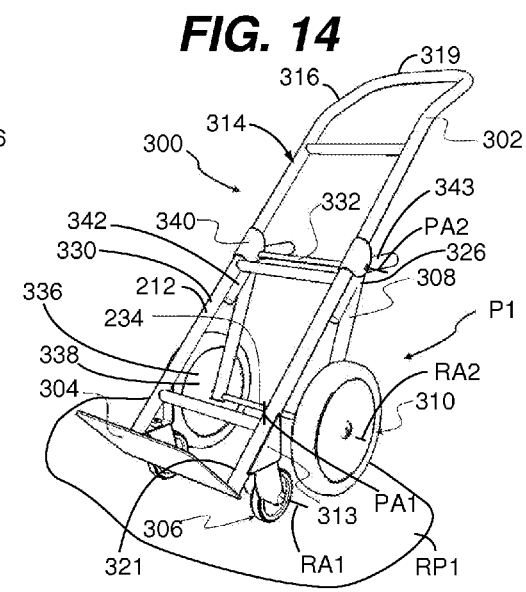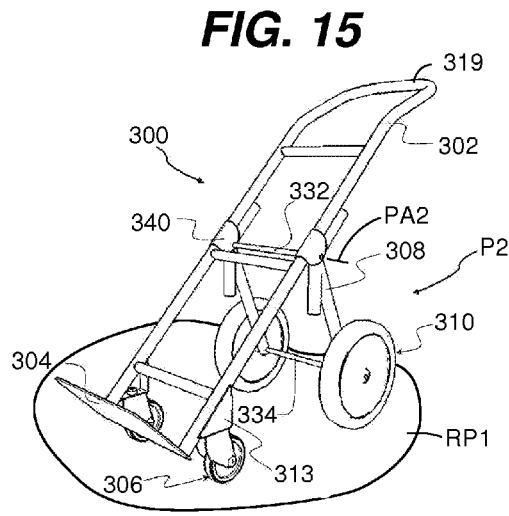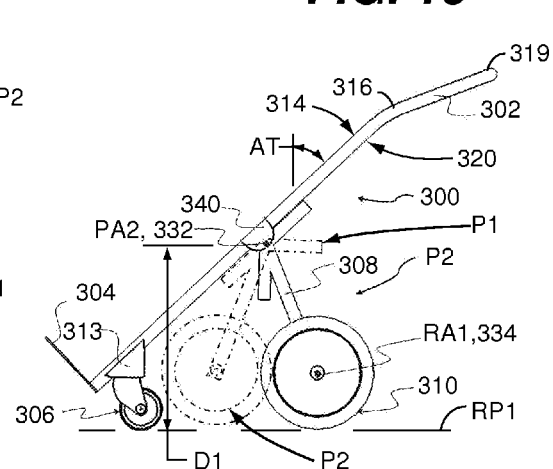

KIT FOR PROVIDING WHEELED APPARATUS HAVING MULTIPLE WHEELBASE USE CONFIGURATIONS

CROSS REFERENCE TO RELATED APPLICATIONS

This continuation-in-part patent application claims priority from U.S. Provisional Patent Application Ser. No. 12/799,156; filed Apr. 20, 2010; entitled "System And Apparatus For A Mobile Wheeled Truck", having a common applicant herewith and being incorporated herein in its entirety by reference, which claim priority from co-pending U.S. Provisional Patent Application Ser. No. 61/171,698; filed Apr. 22, 2009; entitled "System And Apparatus For A Mobile Wheeled Truck", having a common applicant herewith and being incorporated herein in its entirety by reference.

FIELD OF THE DISCLOSURE

The disclosures made herein relate generally to the field of hand trucks and carts (collectively referred to herein as hand trucks) and, more particularly, to hand trucks with a plurality of wheels on a main frame thereof and one or more other wheels on a subframe thereof movably attached to the main frame in a manner allowing the subframe to be moved between multiple position with respect to the main frame.

BACKGROUND

Hand trucks and carts are used to transport a wide variety of objects such as boxes, gas cylinders, welding equipment, tools, mechanical parts and other items. Most of these hand trucks are either a 2-wheel design or a 4-wheel design. However, some hand trucks can convert from a 2-wheel configuration to a 4-wheel configuration.

An example of a known 2-wheeled hand truck is disclosed in U.S. Pat. No. D273,522. With such a 2-wheel hand trucks, an operator of the 2-wheel hand truck maintains a main frame of the 2-wheel hand truck in a tilted orientation with respect to the ground (e.g., at approximate a 45-degree angle) when carrying a load on a load platform (i.e., a load support structure) of the 2-wheel hand truck. As such, a load carried on the load platform of a 2-wheel hand truck is always partially supported by the operator when the 2-wheel hand truck is in its mobile (i.e., tilted) position. The need for the operator to partially support the load when a 2-wheel hand truck is in a mobile position can result in the operator becoming strained and/or fatigued. It also means the operator's hands are not free for other tasks, such as opening doors, ensuring the load remains securely positioned on the load platform, etc.

The objective of maintaining a 2-wheel hand truck in a tilted orientation is to position a center of gravity of the load over the rotational axis (e.g., axle) of the wheels. Positioning the load in such a manner minimizes the effective weight that the operator is supporting. However, the shape of the load and/or it's position on the load platform can dictate its center of gravity relative to the location of the load on the load platform, thereby reducing the "leverage effect" provided by a 2-wheeled hand truck. Similarly, it is not always practical or possible for an operator to maintain a 2-wheel hand truck in an optimized tilted position (e.g., during certain maneuvers, when traversing certain obstacles (e.g., stair), etc). As such, an optimized leverage effect of a 2-wheel hand truck can be highly independent of a tilt angle preferred or required by an operator.

In an effort to overcome limitations and drawbacks of 2-wheel hand trucks, various 4-wheel hand trucks have been devised. Such 4-wheel hand trucks support an entire portion of a load when in a mobile position. However, the wheelbase of a 4-wheel hand truck is generally fixed, thereby making them less maneuverable than a 2-wheel hand truck. Furthermore, the frame structure of a 4-wheel hand truck is typically more cumbersome and/or complex than a 2-wheel hand truck. Still further, 4-wheel hand trucks can be less useful when certain obstacles/situations present themselves (e.g., traversing stairs). An example of a known 4-wheeled hand truck is disclosed in U.S. Pat. Nos. 5,277,439 and 6,848,881.

In an effort to overcome limitations and drawbacks of 2-wheel hand trucks and 4-wheel hand trucks, 2-to-4 wheel convertible hand trucks have been devised. In one manner or another, these 2-to-4 wheel convertible hand trucks can be selectively configured and/or used as a 2-wheel hand truck or a 4-wheel hand truck. When in a 2-wheel configuration, a load can be supported in much the same manner as with a 2-wheel hand truck, as discussed above. When in a 4-wheel configuration, a load can be supported in much the same manner as with a 4-wheel hand truck, as discussed above. Many of these 2-to-4 wheel convertible hand trucks require latching mechanisms or can require reconfiguration of the hand truck's frame for switching between 2-wheel operation and 4-wheel operation. Furthermore, conversion between wheel configurations can sometimes require that there is no load on the hand truck (e.g., secondary wheels are not attached to the main frame in such a way that they pivot freely). Still further, when in the 4-wheel configuration, the wheelbase is generally a relatively long (e.g., extended) and there is not a secondary 4-wheel configuration short wheelbase use configuration. As such, 2-to-4 wheel convertible hand trucks are often cumbersome to provide both 2-wheel and 4-wheel operations, which can be a considerable disadvantage in situations where a load is being moved across a flat surface and then needs to be transported over obstacles (e.g., up or down stairs). Examples of such known 2-to-4 wheel convertible hand trucks are disclosed U.S. Pat. Nos. 3,647,236; 4,921,270; 5,207,439 6,308,967; 6,328,319; and 6,364,328.

Therefore, a hand truck offering 2-to-4 wheel conversion functionality in a manner that overcomes shortcomings associated with prior art hand trucks would be advantageous, desirable and useful.

SUMMARY OF THE DISCLOSURE

A wheeled apparatus configured in accordance with the present invention (e.g., a hand truck, grocery cart, etc) provided a variable length wheelbase between forward and rear wheels. Advantageously, such variable length wheelbase can be selectively altered while the apparatus is loaded and while the wheeled apparatus is being moved across a support surface (e.g., across a floor). During use, the weight of the wheeled apparatus and its load maintain the wheeled apparatus in a given wheelbase use configuration. The wheelbase of the wheeled apparatus can be user-selected for offering stability and/or maneuverability during use of the wheeled apparatus (e.g., while rolling the apparatus). In one specific example, the user-selectable wheelbase can be selectively switched between a wheelbase that optimized stability while rolling (long wheelbase use configuration) and a wheelbase that offers stability and control while traversing an obstacle such as steps (short wheelbase use configuration). A key aspect to the present invention is that such altering of the wheelbase is performed while holding a hand gripping portion of the wheeled apparatus and without the need for manipulating any separate actuators or controls. The user need only momentarily and slightly change a tilted orientation and speed of the wheeled apparatus for changing the wheeled apparatus between the first and second wheelbase use configurations. The loads "center of gravity" over the wheels also influences whether the wheeled apparatus will be in the short-base configuration or the long-base configuration.

A hand truck configured in accordance with the present invention (i.e., hand truck 10) is shown in FIGS. 1-3. In a loading orientation LO (FIG. 1), front wheels 12 are adjacent the support surface SS (e.g., floor) and contact the support surface SS before rear wheels 16. Beneficially, the relatively small-diameter of the front wheels 12 provide for reduced lift-over height (i.e., leverage effect resulting from diameter of front wheels 12) associated with moving the hand truck 10 from its loading orientation LO to its mobile orientation MO (FIGS. 2-3). This reduced lift-over height (i.e., reduced relative to conventional hand trucks) reduces operator strain when moving the hand truck 10 from its loading orientation LO to its mobile orientation MO. Once in its mobile orientation MO in which the front wheels 12 and the rear wheels 16 are engaged with the support surface SS, an operator of the hand truck 10 selectively change the hand truck 10 between its short wheelbase use configuration SWC (FIG. 2) and its long wheelbase use configuration LWC (FIG. 3) by momentarily and slightly changing a tilted orientation and velocity of the hand truck 10. To change the hand truck 10 from its short wheelbase use configuration SWC to its long wheelbase use configuration LWC, the operator momentarily accelerates (e.g., slightly increasing its speed when moving forward) or moves the hand truck 10 forward from rest while applying a slight upward force on a main frame 18 of the hand truck 10, thereby causing a subframe 20 that is pivotably attached to the main frame 18 to move from a first subframe position P1 with respect to the main frame 18 to a second subframe position P2 with respect to the main frame 18. Similarly, to change the hand truck 10 from its long wheelbase use configuration LWC to its short wheelbase use configuration SWC, the operator momentarily decelerates the hand truck 10 (e.g., slightly decreasing its speed when moving forward) or moves the hand truck 12 rearward from rest while applying a slight upward force on a main frame 18 of the hand truck 10 the subframe 20, thereby causing the subframe 20 to move from the second subframe position P2 to the first subframe position P1. Advantageously, the operator does not have to support any portion of the weight of the load when the hand truck 10 is its mobile orientation MO.

In one embodiment of the present invention, a kit for modifying a wheeled apparatus has a main frame and a load support structure attached to the main frame at a first end portion thereof such that the load support structure extends forward of a front side of the main frame. The kit comprises a set of caster unit mounts, a set of caster units, a subframe mounting structure, and a subframe. Each one of the caster unit mounts has a caster unit mounting structure and a main frame engaging structure attached to the caster unit mounting structure. The main frame engaging structure is configured for being secured to at least one of the main frame and the load support structure. Each one of the caster units has a mounting portion configured for being secured to the caster unit mounting structure of a respective one of the caster unit mounts such that a first-size wheel thereof can rotate about of a rotational axis thereof and pivot about a pivot axis thereof. The pivot axis extends substantially perpendicular to the rotational axis. The subframe mounting structure is configured for being secured to the main frame. The subframe has a first end portion thereof pivotably attached to the subframe mounting structure and a second end portion thereof having a second size wheel mounting structure integral therewith.

In another embodiment of the present invention, a kit for modifying a wheeled apparatus has a main frame and a load support structure attached to a first end portion of the main frame such that the load support structure extends forward of a front side of the main frame. The kit comprises a first-size wheel assembly and a subframe assembly. The first-size wheel assembly includes a wheel assembly mounting structure having two first-size wheels attached thereto in a spaced apart arrangement. The wheel assembly mounting structure is attachable to the main frame at the first end portion thereof such that the first-size wheels are located on a rear side of the main frame when the wheel assembly mounting structure is attached to the main frame. The first-size wheels are each pivotably attached to the wheel assembly mounting structure for being pivoted about a pivot axis extending substantially perpendicular to a rotational axis of a respective one of the first-size wheels. The wheel assembly mounting structure is configured such that the pivot axis extends in a substantially skewed orientation with respect to a load support surface of the load support structure when the wheel assembly mounting structure is attached to the main frame. The subframe assembly includes a subframe mounting structure and a subframe pivotably attached at a first end portion thereof to the subframe mounting structure. The subframe mounting structure is attachable to the main frame at a location between a second end portion thereof and a mounting location of the first-size wheel assembly. The subframe is attached to the subframe mounting structure in a manner for allowing the subframe to be pivoted between a first position and a second position when the subframe mounting structure is attached to the main frame.

In another embodiment of the present invention, a kit for modifying a hand truck has a main frame and a load support structure attached to the main frame at a first end portion thereof such that the load support structure extends forward of a front side of the main frame. The kit comprises a set of first-size wheel assemblies and a wheelbase varying assembly. Each one of the first-size wheel assemblies has a mounting bracket attachable to the main frame at the first end portion thereof on a rear side of the main frame. Each one of the first-size wheel assemblies includes a first-size wheel that is pivotably attached to the mounting bracket of the respective one of the first-size wheel assemblies in a manner permitting pivoting thereof about a pivot axis extending substantially perpendicular to a rotational axis of the first size wheel. The wheelbase varying assembly includes a main frame mounting structure, a wheel attachment structure and a pair of second-size wheels. The main frame mounting structure is attachable to the main frame at a location between a second end portion thereof and a mounting location of the first-size wheel assemblies. The wheel attachment structure is pivotably attached to the main frame mounting structure for allowing the wheel attachment structure to be pivoted about a pivot axis thereof. The second-size wheels are rotatably attached to a second end portion of the wheel attachment structure. Each one of the second size wheels has a maximum diameter equal to or greater than a maximum diameter of the first-size wheels. The wheel attachment structure is pivotable between a first pivot position and a second position with respect to the main frame mounting structure of the wheelbase varying assembly.

These and other objects, embodiments, advantages and/or distinctions of the present invention will become readily apparent upon further review of the following specification, associated drawings and appended claims.

BRIEF DESCRIPTION OF THE DRAWINGS

FIG. 9 is a perspective view showing a hand truck configured in accordance with a second embodiment of the present invention, wherein the hand truck is in a vertical loading orientation.

FIG. 10 is a perspective view showing the hand truck of FIG. 9 in a short wheelbase use configuration.

FIG. 11 is a perspective view showing the hand truck of FIG. 9 in a long wheelbase use configuration.

FIG. 12 is a side view of the hand truck of FIG. 9 showing relative positioning of a subframe of the hand truck when in its short and long wheelbase use configurations.

FIG. 13 is a perspective view showing a hand truck configured in accordance with a third embodiment of the present invention, wherein the hand truck is in a vertical loading orientation.

FIG. 14 is a perspective view showing the hand truck of FIG. 13 in a short wheelbase use configuration.

FIG. 15 is a perspective view showing the hand truck of FIG. 13 in a long wheelbase use configuration.

FIG. 16 is a side view of the hand truck of FIG. 13 showing relative positioning of a subframe of the hand truck when in its short and long wheelbase use configurations.

DETAILED DESCRIPTION OF THE DRAWING FIGURES

Figure 1:
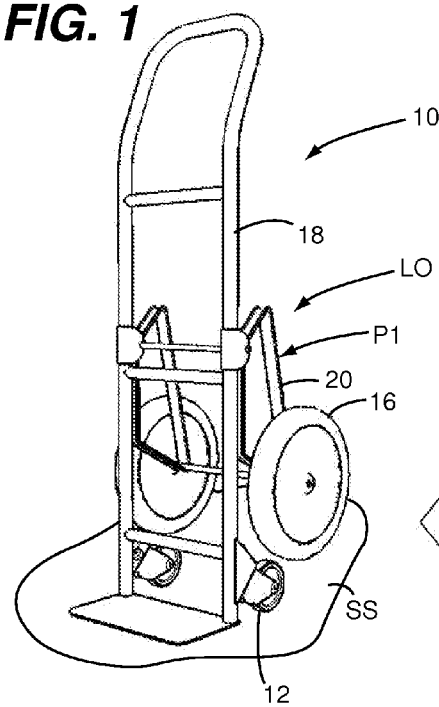
FIG. 1 is a perspective view showing a hand truck configured in accordance the present invention, wherein the hand truck is in a vertical loading orientation.
Figure 2:
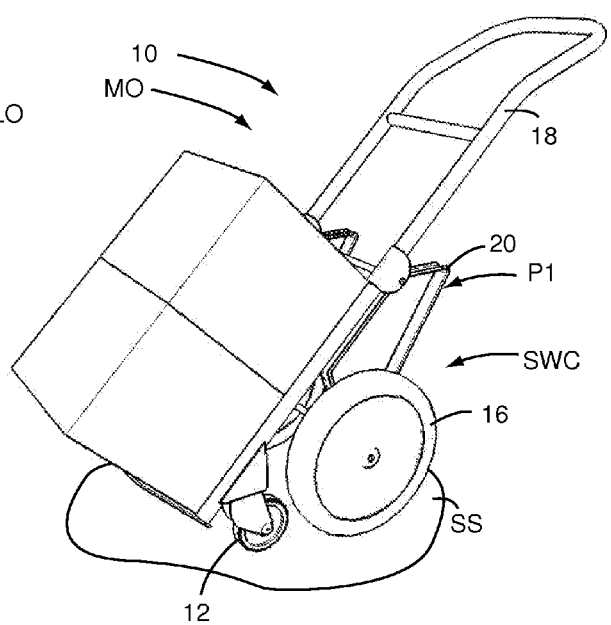
FIG. 2 shows the hand truck of FIG. 1 in a short wheelbase use configuration.
Figure 3:
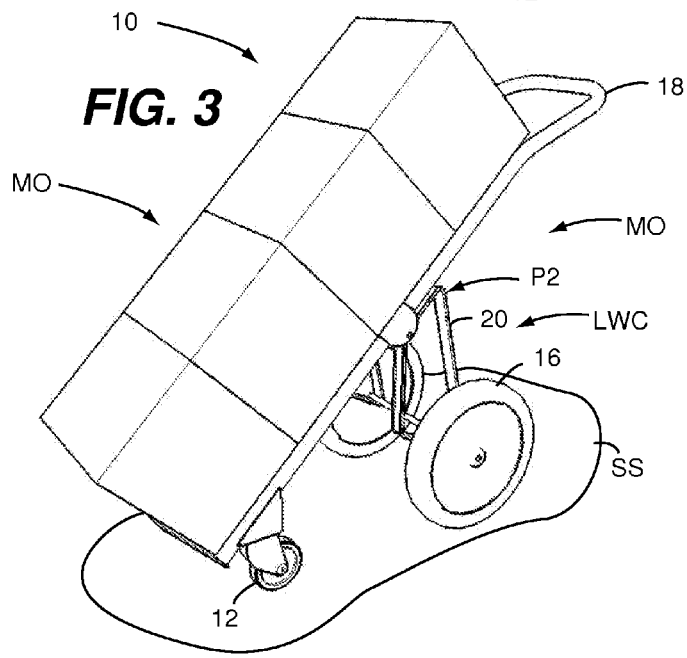
FIG. 3 shows the hand truck of FIG. 1 in a long wheelbase use configuration.

Referring now to FIGS. 4-7, a hand truck 100 configured in accordance with a first embodiment of the present invention is shown. The hand truck 100 comprises a main frame 102, a load platform 104, a pair of casters 106, a subframe 108, and a pair of second-size wheels 110. The load platform 104 is attached to a first end portion 112 of the main frame 102. A load platform for a hand truck is sometimes also referred to as a toe plate, which serves as a load support structure. The load platform 104 extends forward of a front side 114 of the main frame 102. In one embodiment, a chassis configured in accordance with the present invention can include the main frame 102 (i.e., an elongated frame) and the load platform 104 (i.e., a load support structure). The front side 114 of the main frame 102 is generally defined as the side of the main frame 102 that is engagable by a load (e.g., boxes) supported on the load platform 104. The front side 114 of the main frame 102 includes front facing portions of generally U-shaped frame 116 and front facing portions of cross members 118 connected to the frame 116. A closed end 119 of the frame 116 serves as a hand-gripping portion and legs 121 of the frame 116 at its open end are joined by the load platform 104. Preferably, but not necessarily, the load platform 104 is a flat plate attached perpendicularly to the legs 121 of the frame 116. Jointly, a chassis of the hand truck 100 includes the main frame 102 and the load platform 104.

The casters 106 are attached in a spaced apart arrangement to the main frame 102 at its first end portion 112 through caster mounts 113 of the main frame 102. The casters 106 are each located on a rear side 120 of the main frame 102. The rear side 120 of the main frame 102 is generally opposite the front side 114 of the main frame 102. The casters 106, which include first-size wheels 122, are each pivotably attached to the main frame 102 for being pivoted about a caster pivot axis PA1 that extends substantially perpendicular to a rotational axis RA1 of a respective one of the first-size wheels 122 and that extends in a substantially skewed orientation with respect to a load support surface 124 of the load platform 104 and the front side 114 of the main frame 102. It is disclosed herein that, in at least one embodiment of the present invention, non-caster wheels or wheel assemblies can replace the casters 106.

The subframe 108 is pivotably attached at a first end portion 126 to the main frame 102 at a position between the casters 106 and the closed end portion 119 of the frame 116 (i.e., a second end portion of the main frame 102). The subframe 108 is attached to the main frame 102 in a manner for allowing the subframe 108 to be freely pivoted about a pivot axis PA2 of the subframe 108 between a first subframe position P1 and a second subframe position P2 with respect to the main frame 102. The subframe 108 and the main frame 102 jointly limit movement of the subframe 108 to be between the first subframe position P1 and second subframe position P2 with respect to the main frame 102.

The subframe 108 includes spaced apart subframe members 130, a subframe pivot axle 132, and a subframe wheel axle 134. The spaced apart subframe members 130 are trapezoid shaped. The subframe pivot axle 132 is attached to a first end portion 134 of each one of the subframe members 130 (i.e., the first end portion 126 of the subframe 108) and the subframe wheel axle 134 is attached to a second end portion 136 of each one of the subframe members 130 (i.e., a second end portion 138 of the subframe 108). Preferably, but not necessarily, the subframe pivot axle 132 and the subframe wheel axle 134 can both be made from a metal bar or rod and the subframe members can be made from channelled steel. The subframe pivot axle 132 is pivotably attached to spaced apart pivot axle supports 140 of the main frame 102, thereby providing a subframe pivot axis PA2 about which the subframe 108 pivots.

The second-size wheels 110 are rotatably mounted in the subframe wheel axle 134 and rotate about a rotation axle RA2 defined by the subframe wheel axle 134. Preferably, the subframe pivot axle 132 and the subframe wheel axle 134 are arranged such that the rotation axis RA2 about which the second-size wheels 110 rotate extends substantially parallel with the subframe pivot axis PA2. As depicted, a track width of the second-size wheels 110 can be greater than a track width of the first-size wheels 122. Alternatively, the track width of the second-size wheels 110 can be less or approximately equal to the track width of the first-size wheels 122. It is disclosed herein that an apparatus configured in accordance with the present invention can have only one second-size wheel attached to the subframe with such single second-size wheel being positioned within a track width of a pair of first-size wheels (e.g., centered between a track width of a pair of first-size wheels. It is disclosed herein that, in at least one embodiment of the present invention, the second-size wheels can be replaced by casters.

Figure 4:
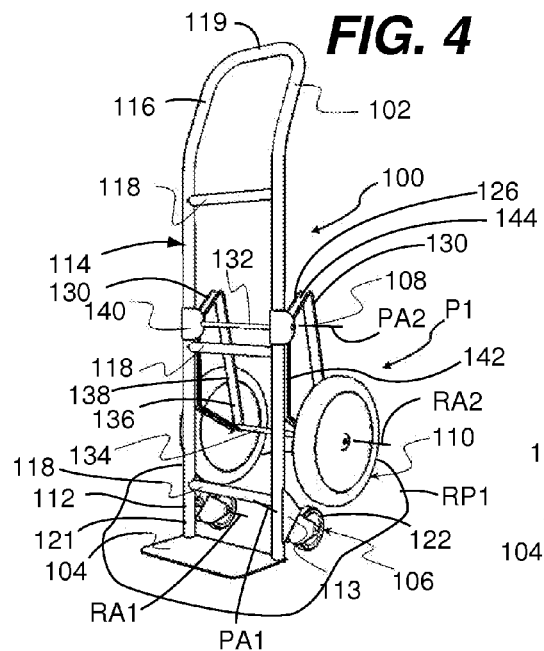
FIG. 4 is a perspective view showing a hand truck configured in accordance with a first embodiment of the present invention, wherein the hand truck is in a vertical loading orientation.

As shown in FIGS. 4-7, the subframe 108 can be freely pivoted about the subframe pivot axis PA2 between the first subframe position P1 and the second subframe position P2. When the hand truck 100 is in its vertical position with the load platform 104 flat on the reference plane RP1 (i.e., a support surface) as shown in FIG. 4, gravity causes the subframe 108 to pivot into its first subframe position P1. The subframe members 130 are shaped for allowing the second-size wheels 110 to be mounted in a manner such that the second-size wheels 110 do not extend forward of the front face 114 of the main frame 102, do not interfere with a load supported by the hand truck 100, and, do not interfere with pivoting of the first size wheels 122 about their respective pivot axis PA1. Preferably, but not necessarily, the subframe members 130 are shaped such that the second-size wheels 110 do not extend forward of a rear face 120 of the main frame 102.

Figure 5:
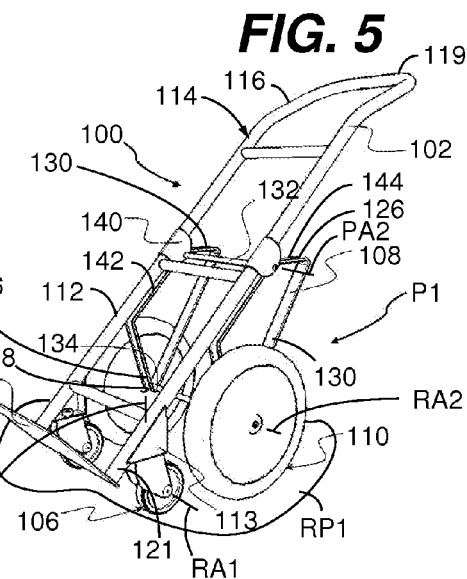
FIG. 5 is a perspective view showing the hand truck of FIG. 4 in a short wheelbase use configuration.
Figure 6:
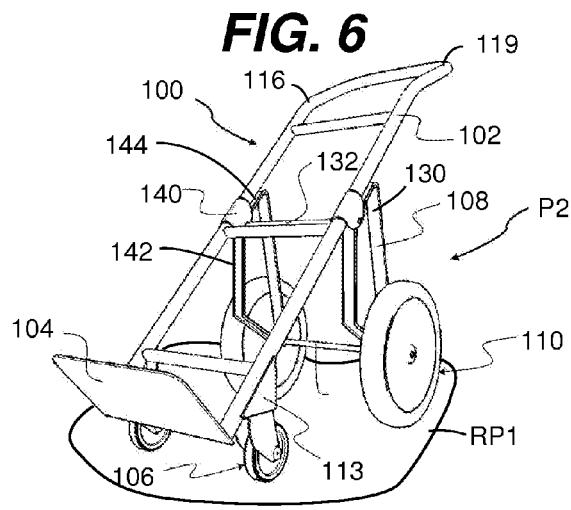
FIG. 6 is a perspective view showing the hand truck of FIG. 1 in a long wheelbase use configuration.
Figure 7:
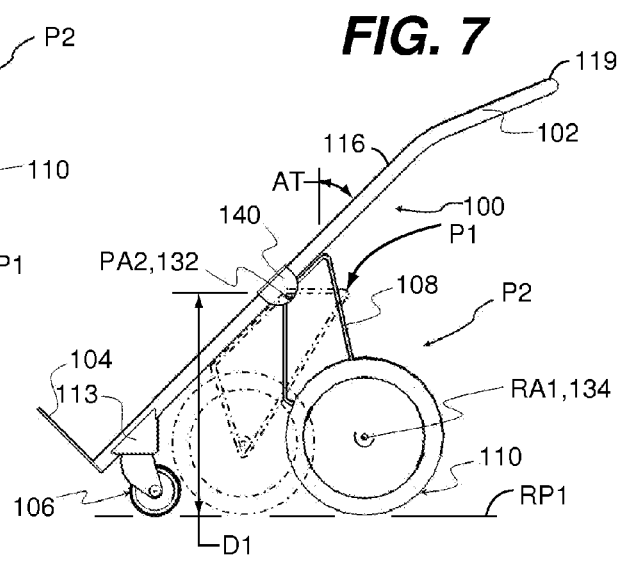
FIG. 7 is a side view of the hand truck of FIG. 1 showing relative positioning of a subframe of the hand truck when in its short and long wheelbase use configurations.

When the hand truck 100 (or other wheeled apparatuses configured in accordance with the present invention) is in its loading orientation (FIG. 4), the toe plate 104 and the first size wheels 122 are in contact with the common reference plane RF1, thereby holding the first size wheels 122 in a pivoted orientation with respect to their pivot PA1 such that their rotational axes RA1 are parallel with the rotational axis RA2 of the subframe wheel axle 134. When the hand truck 100 is tilted back from its loading orientation (FIG. 4), the hand truck 100 pivots about the rotational axis RA1 of the first-size wheels 122. With sufficient pivoting, the second-size wheels 110 come into contact with the common reference plane RP1 and the subframe 108 is held in the first subframe position P1 by weight of the hand truck 100, thereby providing the hand truck 100 in its short wheelbase use configuration, as is shown in FIGS. 5 and 7. In its short wheelbase use configuration, the hand truck 100 can be moved easily with the four wheels of the hand truck 100 supporting its entire weight and any load thereon. If additional stability is required, the subframe 108 can be moved to the second subframe position P2, thereby putting the hand truck 100 in its long wheelbase use configuration (FIGS. 6 and 7), which is useful for loads with a high center of gravity. As can be seen, the subframe 108 is held in the second subframe position P2 by weight of the hand truck 100.

Beneficially, the position of the subframe wheel axle 134 makes it easier to move the hand truck 100 from the loading orientation to the short wheelbase use configuration. A prior art hand truck uses 6" or 8" inch wheels, placing the axle 3" to 4" from the ground and frame of the hand truck. When attempting to tilt the prior art hand truck from the loading orientation to its tilted configuration when loaded with a large heavy load, the operator places their foot on the axle and leans their body backwards as leverage. Whether they are successful in tilting the load often depends on the size, strength and weight or the operator. In contrast, the position of the subframe wheel axle 134 of the hand truck 100 is considerably higher from the ground when the hand truck 100 is in the loading position LP (e.g., 10" from the ground). As such, a user is provided with much greater leverage, thus making it easier to tilt heavier loads.

When rotated sufficiently about the subframe pivot axis PA2 in a first angular direction, a first upper edge portion 142 of each subframe member 130 contacts the main frame 102 thereby stopping pivoting of the subframe 102 at the first subframe position P1. When rotated sufficiently about the subframe pivot axis PA2 in a second angular direction opposite the first angular direction, a second upper edge portion 144 of each subframe member 130 contacts the main frame 102 thereby stopping pivoting of the subframe 102 at the second subframe position P2. In this manner, the subframe 108 engages a first mating portion of the main frame 102 when in the first subframe position P1 such that movement of the subframe 108 terminates at the first subframe position P1 when sufficiently pivoted in the first pivot direction about the subframe pivot axis PA2 and the subframe 108 engages a second mating portion of the main frame 102 when in the second subframe position P2 thereof such that movement of the subframe 108 terminates at the second subframe position P2 when sufficiently pivoted in the second pivot direction about the subframe pivot axis PA2. Thus, such pivoting action of the subframe 108 with respect to the main frame 102 allows the second-size wheels 110 be freely moved for providing the hand truck 100 with a short wheel configuration when the subframe 108 is at the first subframe position P1 and a long wheelbase use configuration when the subframe 108 is at the second subframe position P2. The geometry of a wheeled apparatus configured in accordance with the present invention (e.g., the hand truck 100) is such that gravity engages the subframe with the main frame for holding the wheeled apparatus in its long and short wheelbase use configurations without any need for latches or other securing mechanisms.

As depicted in FIGS. 4-7, a maximum diameter of the second-size wheels 110 can be greater than a maximum diameter of the first-size wheels 122. It is disclosed herein that the maximum diameter of the second-size wheels 110 can be smaller than or approximately the same as the maximum diameter of the first-size wheels 122. Regardless of the diameter of the first-size wheels 122 and second-size wheels 110, it is preferable that a position and/or the maximum diameter of the first-size wheels 122 and a position and/or the maximum diameter of the second-size wheels 110 be jointly configured for allowing the first-size wheels 122 to each be pivoted fully around the respective caster pivot axis PA1 without coming into contact with an adjacent one of the second-size wheels 110 (i.e., wheels on a common side of the main frame 102) when the subframe 108 is in the first subframe position P1. This caster pivoting functionality is preferably provided in all wheeled apparatuses of the present invention that have a caster-wheel configuration similar to that of the hand truck 100 of FIGS. 4-7.

It is disclosed herein that the subframe members 130, the subframe pivot axle 132, and the subframe wheel axle 134 jointly define an embodiment of a wheelbase varying assembly configured in accordance with the present invention. However, it is also disclosed herein that such a wheelbase varying assembly need not include two subframe members and need not include a subframe pivot axle and/or a subframe wheel axle. For example, a wheelbase varying assembly can include a single subframe member to which second size wheels are attached using a bolt or the like that serve as discrete axles for a respective one of the second-size wheels. Such a single frame member can be attached to a main frame via an integral subframe axle, via a subframe axle that is integral with the main frame, or via one or more bolts that pivotably secure the subframe member to the mainframe.

As shown in FIG. 7, for a given angular tilt AT (e.g., 45-degrees from vertical) of the main frame 102 with respect to a common reference plane RP1 (e.g., a flat support surface), the first-size wheels 122 and the second-size wheels 110 all simultaneously sit on the common reference plane RP1 when the subframe 108 is in the first subframe position P1 and while the first-size wheels 122 are in any pivoted position with respect to the caster pivot axis PA1 and simultaneously sit on the common reference plane RP1 when the subframe 108 is in the second subframe position P2 while the first-size wheels are in any pivoted position with respect to the caster pivot axis PA1. To this end, it can be seen that the subframe 108 and the main frame 102 are jointly configured such that the subframe pivot axis PA2 is at a distance D1 above the common reference plane RP1 when the subframe is in the first subframe position P1 and in the second subframe position P1. As such, for a given flat support surface, a tilted orientation of the main frame 102 stays the same regardless of whether the subframe 108 is in the first subframe position P1 or the second subframe position P2. From a geometry standpoint, this means that an arc that the subframe 108 travels though between the first and second subframe positions P1, P2 is bisected by a reference axis that extends perpendicular to the common reference plane RP1 through the second pivot axis PA2. Accordingly, the angular tilt of the main frame 102 when the subframe is in the first subframe position P1 and when in the second subframe position P2 can be controlled through angular position of the subframe 108 when movement of the subframe 108 is terminated by contact with the mainframe 102 at the first subframe position P1 and angular position of the subframe 108 when movement of the subframe 108 is terminated by contact with the mainframe 102 at the second subframe position P2. It is disclosed herein that the subframe 108 and/or the main frame 102 can include adjustable stops for allowing the subframe positions P1, P2 to be selectively adjustable.

Figure 8:
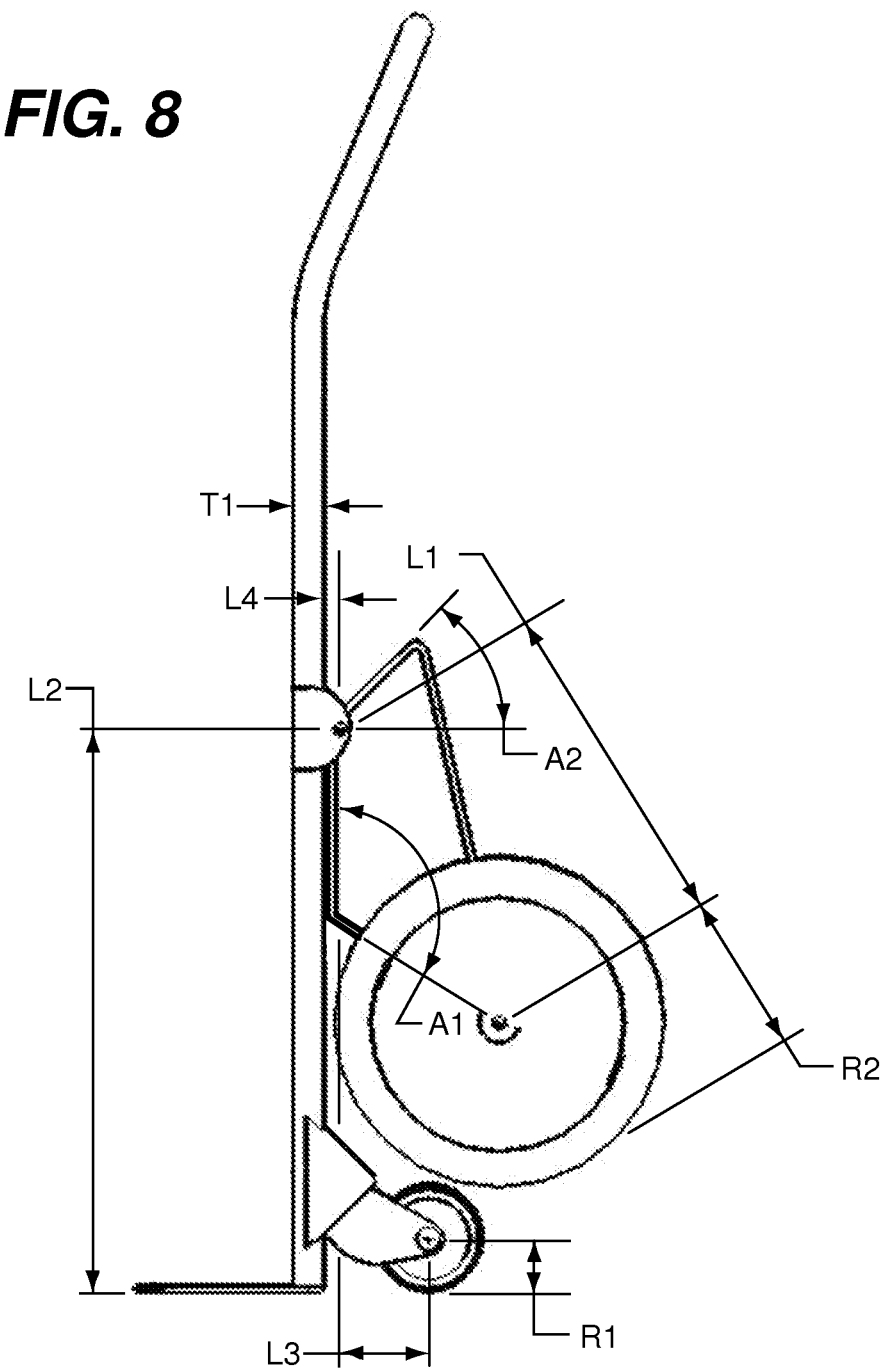
FIG. 8 is a side view of the hand truck of FIG. 1 showing various design dimensions.

Referring to FIG. 8, dimensions relating to wheelbase varying functionality of the hand truck 100 of FIGS. 4-7 are shown. In one example, which is not limiting of dimensions for apparatuses configured in accordance with the present invention, values for these dimensions are provided below in Table 1.

TABLE 1

Example of Hand Truck Dimensions

| Dimension | Value |
|---|---|
| L1 | 14.125" |
| L2 | 24.125" |
| L3 | 3.375" |
| L4 | 0.625" |
| R1 | 2" |
| R2 | 7" |
| A1 | 135-degrees |
| A2 | 45-degrees |
| T1 | 1.00" |

Referring now to FIGS. 9-12, a hand truck 200 configured in accordance with a second embodiment of the present invention is shown. The underlying construction and functionality of the hand truck 200 is the same as that of the hand truck 100. However, the hand truck 200 employs bent tubular members in its subframe construction as opposed to the trapezoidal shaped channelled subframe members of the hand truck 100.

The hand truck 200 comprises a main frame 202, a load platform 204, a pair of casters 206, a sub frame 208, and a pair of second-size wheels 210. The load platform 204 is attached to a first end portion 212 of the to the main frame 202. The load platform 204 extends forward of a front side 214 of the main frame 202. The front side 214 of the main frame 202 is generally defined as the side of the main frame 202 that is engagable by a load (e.g., boxes) supported on the load platform 204. The front side 214 of the main frame 202 includes front facing portions of generally U-shaped frame 216 and front facing portions of cross members 218 connected to the frame 216. A closed end 219 of the frame 216 serves as a hand-gripping portion and the legs 221 of the frame 216 at its open end are joined by the load platform 204. Preferably, but not necessarily, the load platform 204 is a flat plate attached perpendicularly to the legs 221 of the frame 216. Jointly, a chassis of the hand truck 200 includes the main frame 202 and the load platform 204.

The casters 206 are attached in a spaced apart arrangement to the main frame 202 at its first end portion 212 through caster mounts 213 of the main frame 202. The casters 206 are each located on a rear side 220 of the main frame 202. The rear side 220 of the main frame 202 is generally opposite the front side 214 of the main frame 202. The casters 206, which include first-size wheels 222, are each pivotably attached to the main frame 202 for being pivoted about a caster pivot axis PA1 that extends substantially perpendicular to a rotational axis RA1 of a respective one of the first-size wheels 222 and that extends in a substantially skewed orientation with respect to a load support surface 224 of the load platform 204 and the front side 214 of the main frame 202.

The subframe 208 is pivotably attached at a first end portion 226 to the main frame 202 at a position between the casters 206 and the closed end portion 219 of the frame 216 (i.e., a second end portion of the main frame 202). The subframe 208 is attached to the main frame 202 in a manner for allowing the subframe 208 to be freely pivoted about a pivot axis PA2 of the subframe 208 between a first subframe position P1 and a second subframe position P2 with respect to the main frame 202. The subframe 208 and the main frame 202 jointly limit movement of the subframe 208 to be between the first subframe position P1 and second subframe position P2.

The subframe 208 includes spaced apart subframe members 230, a subframe pivot axle 232, and a subframe wheel axle 234. The spaced apart subframe members 230 are bent tubular members. The subframe pivot axle 232 is attached to a first end portion 234 of each one of the subframe members 230 (i.e., the first end portion 226 of the subframe 208) and the subframe wheel axle 234 is attached to a second end portion 236 of each one of the subframe members 230 (i.e., a second end portion 238 of the subframe 208). Preferably, but not necessarily, the subframe pivot axle 232 and the subframe wheel axle 234 can both be made from a metal bar or rod and the subframe members can be made from steel tubing. The subframe pivot axle 232 is pivotably attached to spaced apart pivot axle supports 240 of the main frame 202, thereby providing a subframe pivot axis PA2 about which the subframe 208 pivots with respect to the main frame 202.

The second-size wheels 210 are rotatably mounted in the subframe wheel axle 234 and rotate about a rotation axle RA2 defined by the subframe wheel axle 234. Preferably, the subframe pivot axle 232 and the subframe wheel axle 234 are arranged such that the rotation axis RA2 about which the second-size wheels 210 rotate extends substantially parallel with the subframe pivot axis PA2. As depicted, a track width of the second-size wheels 210 can be greater than a track width of the first-size wheels 222. Alternatively, the track width of the second-size wheels 210 can be less or approximately equal to the track width of the first-size wheels 222.

As shown in FIGS. 9-12, the subframe 208 can be freely pivoted about the subframe pivot axis PA2 between the first subframe position P1 and the second subframe position P2. When the hand truck 200 is in its vertical position with the load platform 204 flat on the reference plane RP1 (i.e., a support surface) as shown in FIG. 9, gravity causes the subframe 208 to pivot into its first subframe position P1. The subframe members 230 are shaped for allowing the second-size wheels 210 to be mounted in a manner such that the second-size wheels 210 do not extend forward of the front face 214 of the main frame 202, do not interfere with a load supported by the hand truck 200, and, do not interfere with pivoting of the first size wheels 222 about their respective pivot axis PA1. Preferably, but not necessarily, the subframe members 230 are shaped such that the second-size wheels 210 do not extend forward of the rear face 220 of the main frame 202.

When the hand truck 200 is tilted back from its loading orientation (FIG. 9), the hand truck 200 pivots about the rotational axis RA1 of the first-size wheels 222. With sufficient pivoting, the second-size wheels 210 come into contact with the common reference plane RP 1 and the subframe 208 is held in the first subframe position P1 by weight of the hand truck 200, thereby providing the hand truck 200 in its short wheelbase use configuration, as is shown in FIGS. 10 and 12. In its short wheelbase use configuration, the hand truck 200 can be moved easily with the four wheels of the hand truck 200 supporting its entire weight and any load thereon. If additional stability is required, the subframe 208 can be moved to the second subframe position P2, thereby putting the hand truck 200 in its long wheelbase use configuration (FIGS. 11 and 12), which is useful for loads with a high center of gravity. As can be seen, the subframe 208 is held in the second subframe position P2 by weight of the hand truck 200.

When rotated sufficiently about the subframe pivot axis PA2 in a first angular direction, the first end portion 226 of each subframe member 230 contacts the main frame 202 thereby stopping pivoting of the subframe 202 at the first subframe position P1. When rotated sufficiently about the subframe pivot axis PA2 in a second angular direction opposite the first angular direction, the first end portion 226 of each subframe member 230 contacts a subframe stopping portion 245 of the pivot axle supports 240 thereby stopping pivoting of the subframe 202 at the second subframe position P2. The subframe stopping portion 245 of each pivot axle support 240 can be any suitable structure that is configured for contacting the first end portion 226 of each subframe member 230 for limiting its rotation about the subframe pivot axis PA2 (e.g., a piece of material or fastener that is fixedly attached to the subframe member 230 and that blocks the path of travel of the first end portion 226 of each subframe member 230). In this manner, the subframe 208 engages a first mating portion of the main frame 202 when in the first subframe position P1 such that movement of the subframe 208 terminates at the first subframe position P1 when sufficiently pivoted in the first pivot direction about the subframe pivot axis PA2 and the subframe 208 engages a second mating portion of the main frame 202 (i.e., the pivot axle supports 240 can be part of the main frame 202) when in the second subframe position P2 thereof such that movement of the subframe 208 terminates at the second subframe position P2 when sufficiently pivoted in the second pivot direction about the subframe pivot axis PA2. Thus, such pivoting action of the subframe 208 with respect to the main frame 202 allows the second-size wheels 110 be freely moved for providing the hand truck 200 with a short wheel configuration when the subframe 208 is at the first subframe position P1 and a long wheelbase use configuration when the subframe 208 is at the second subframe position P2.

Referring now to FIGS. 13-16, a hand truck 300 configured in accordance with a third embodiment of the present invention is shown. The underlying construction and functionality of the hand truck 300 is the same as that of the hand truck 100. However, the hand truck 300 employs T-shaped subframe members in its subframe construction as opposed to the trapezoidal shaped channelled subframe members of the hand truck 100 (FIGS. 4-7) or the bent tubular members of the hand truck 200 (FIGS. 9-12).

The hand truck 300 comprises a main frame 302, a load platform 304, a pair of casters 306, a sub frame 308, and a pair of second-size wheels 310. The load platform 304 is attached to a first end portion 312 of the to the main frame 302. The load platform 304 extends forward of a front side 314 of the main frame 302. The front side 314 of the main frame 302 is generally defined as the side of the main frame 302 that is engagable by a load (e.g., boxes) supported on the load platform 304. The front side 314 of the main frame 302 includes front facing portions of generally U-shaped frame 316 and front facing portions of cross members 318 connected to the frame 316. A closed end 319 of the frame 316 serves as a hand-gripping portion and legs 321 of the frame 316 at its open end are joined by the load platform 304. Preferably, but not necessarily, the load platform 304 is a flat plate attached perpendicularly to the legs 321 of the frame 316. Jointly, a chassis of the hand truck 300 includes the main frame 302 and the load platform 304.

The casters 306 are attached in a spaced apart arrangement to the main frame 302 at its first end portion 312 through caster mounts 313 of the main frame 302. The casters 306 are each located on a rear side 320 of the main frame 302. The rear side 320 of the main frame 302 is generally opposite the front side 314 of the main frame 302. The casters 306 (i.e., first-size wheels 322 thereof) are each pivotably attached to the main frame 302 for being pivoted about a caster pivot axis PA1 extending substantially perpendicular to a rotational axis RA1 of a respective one of the first-size wheels 322 and extending in a substantially skewed orientation with respect to a load support surface 324 of the load platform 304 and the front side 314 of the main frame 302.

The subframe 308 is pivotably attached at a first end portion 326 to the main frame 302 at a position between the casters 306 and the closed end portion 319 of the frame 316 (i.e., a second end portion of the main frame 302). The subframe 308 is attached to the main frame 302 in a manner for allowing the subframe 308 to be freely pivoted about a pivot axis PA2 of the subframe 308 between a first subframe position P1 and a second subframe position P2 with respect to the main frame 302. The subframe 308 and the main frame 302 jointly limit movement of the subframe 308 to be between the first subframe position P1 and second subframe position P2.

The subframe 308 includes spaced apart subframe members 330, a subframe pivot axle 332, and a subframe wheel axle 334. The spaced apart subframe members 330 are tubular members having two frame engaging legs at one end thereof. The subframe pivot axle 332 is attached to a first end portion 334 of each one of the subframe members 330 (i.e., the first end portion 326 of the subframe 308) and the subframe wheel axle 334 is attached to a second end portion 336 of each one of the subframe members 330 (i.e., a second end portion 338 of the subframe 308). Preferably, but not necessarily, the subframe pivot axle 332 and the subframe wheel axle 334 can both be made from a metal bar or rod and the subframe members can be made from steel tubing. The subframe pivot axle 332 is pivotably attached to spaced apart pivot axle supports 340 of the main frame 302, thereby providing a subframe pivot axis PA2 about which the subframe 308 pivots with respect to the main frame 302.

The second-size wheels 310 are rotatably mounted in the subframe wheel axle 334 and rotate about a rotation axle RA2 defined by the subframe wheel axle 334. Preferably, the subframe pivot axle 332 and the subframe wheel axle 334 are arranged such that the rotation axis RA2 about which the second-size wheels 310 rotate extends substantially parallel with the subframe pivot axis PA2. As depicted, a track width of the second-size wheels 310 can be greater than a track width of the first-size wheels 322. Alternatively, the track width of the second-size wheels 310 can be less or approximately equal to the track width of the first-size wheels 322.

As shown in FIGS. 13-16, the subframe 308 can be freely pivoted about the subframe pivot axis PA2 between the first subframe position P1 and the second subframe position P2. When the hand truck 300 is in its vertical position with the load platform 304 flat on the reference plane RP1 (i.e., a support surface) as shown in FIG. 13, gravity causes the subframe 308 to pivot into its first subframe position P1. The subframe members 330 are shaped for allowing the second-size wheels 310 to be mounted in a manner such that the second-size wheels 310 do not extend forward of the front face 314 of the main frame 302, do not interfere with a load supported by the hand truck 300, and, do not interfere with pivoting of the first size wheels 322 about their respective pivot axis PA1. Preferably, but not necessarily, the subframe members 330 are shaped such that the second-size wheels 310 do not extend forward of the rear face 320 of the main frame 302.

When the hand truck 300 is tilted back from its loading orientation (FIG. 13), the hand truck 300 pivots about the rotational axis RA1 of the first-size wheels 322. With sufficient pivoting, the second-size wheels 310 come into contact with the common reference plane RP 1 and the subframe 308 is held in the first subframe position P1 by weight of the hand truck 300, thereby providing the hand truck 300 in its short wheelbase use configuration, as is shown in FIGS. 14 and 16. In its short wheelbase use configuration, the hand truck 300 can be moved easily with the four wheels of the hand truck 300 supporting its entire weight and any load thereon. If additional stability is required, the subframe 308 can be moved to the second subframe position P2, thereby putting the hand truck 300 in its long wheelbase use configuration (FIGS. 15 and 16), which is useful for loads with a high center of gravity. As can be seen, the subframe 308 is held in the second subframe position P2 by weight of the hand truck 300.

When rotated sufficiently about the subframe pivot axis PA2 in a first angular direction, a first frame engaging leg 342 of each subframe member 330 contacts the main frame 302 thereby stopping pivoting of the subframe 302 at the first subframe position P1. When rotated sufficiently about the subframe pivot axis PA2 in a second angular direction opposite the first angular direction, a second frame engaging leg 343 of each subframe member 330 contacts the main frame 302 thereby stopping pivoting of the subframe 302 at the second subframe position P2. In this manner, the subframe 308 engages a first mating portion of the main frame 302 when in the first subframe position P1 such that movement of the subframe 308 terminates at the first subframe position P1 when sufficiently pivoted in the first pivot direction about the subframe pivot axis PA2 and the subframe 308 engages a second mating portion of the main frame 302 when in the second subframe position P2 thereof such that movement of the subframe 308 terminates at the second subframe position P2 when sufficiently pivoted in the second pivot direction about the subframe pivot axis PA2. Thus, such pivoting action of the subframe 308 with respect to the main frame 302 allows the second-size wheels 110 be freely moved for providing the hand truck 300 with a short wheel configuration when the subframe 308 is at the first subframe position P1 and a long wheelbase use configuration when the subframe 308 is at the second subframe position P2.

Figure 17:
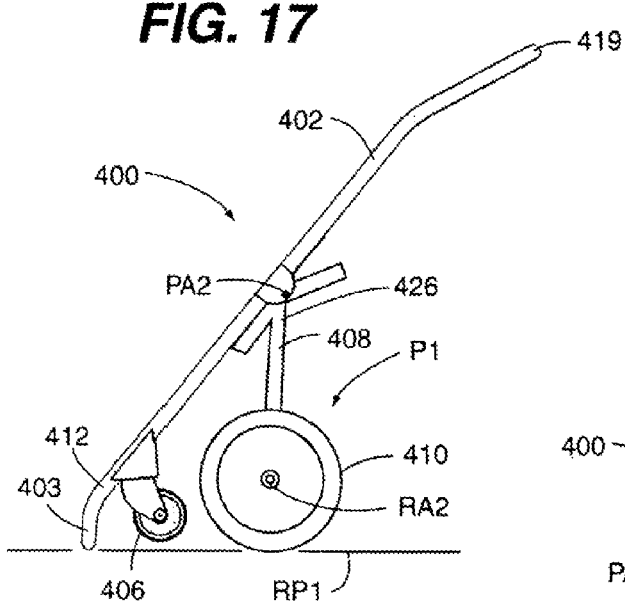
FIG. 17 is a side view showing a wheeled apparatus configured in accordance with a fifth embodiment of the present invention, wherein the wheeled apparatus is in a wheelbase use configuration in which a stop structure inhibits free rolling of the wheeled apparatus.
Figure 18:
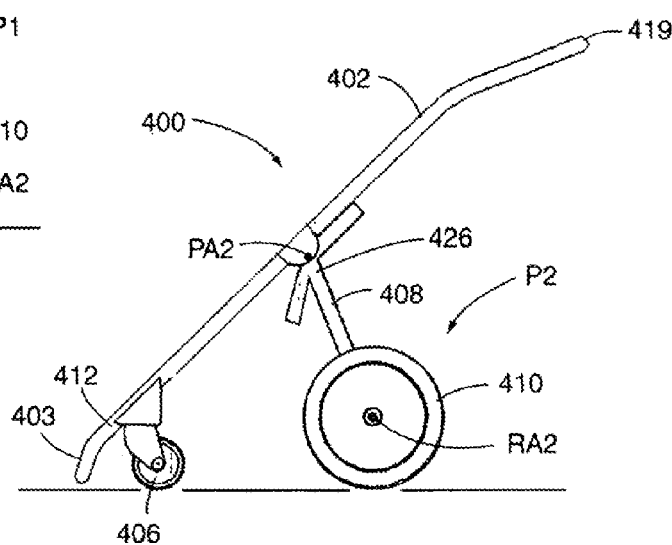
FIG. 18 is a side view showing the wheeled apparatus of FIG. 17, wherein the wheeled apparatus is in a wheelbase use configuration allowing free rolling of the wheeled apparatus.
Figure 19:
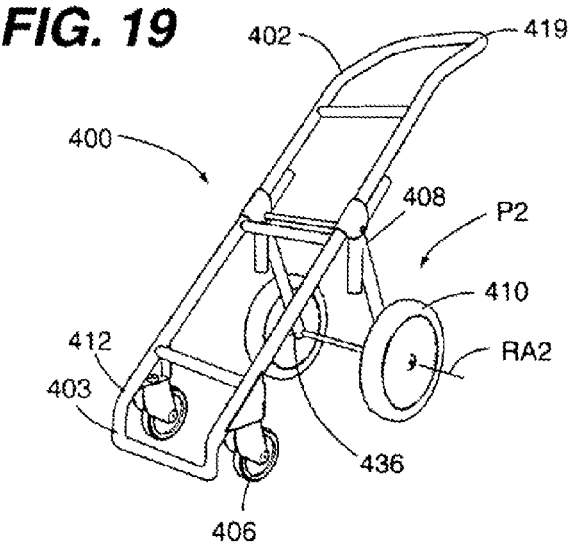
FIG. 19 is a perspective view showing the wheeled apparatus of FIG. 17, wherein the wheeled apparatus is in the wheelbase use configuration allowing free rolling of the wheeled apparatus.
Figure 20:
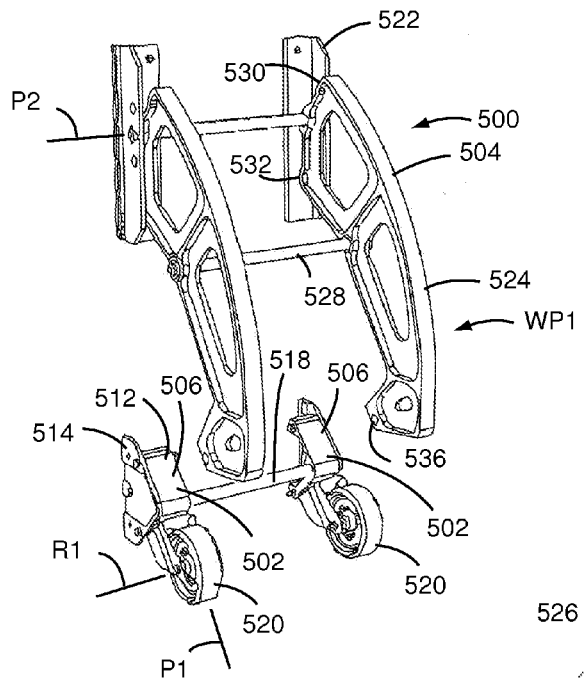
FIG. 20 is a perspective view showing a kit configured in accordance with an embodiment of the present invention for modifying a wheeled apparatus.
Figure 21:
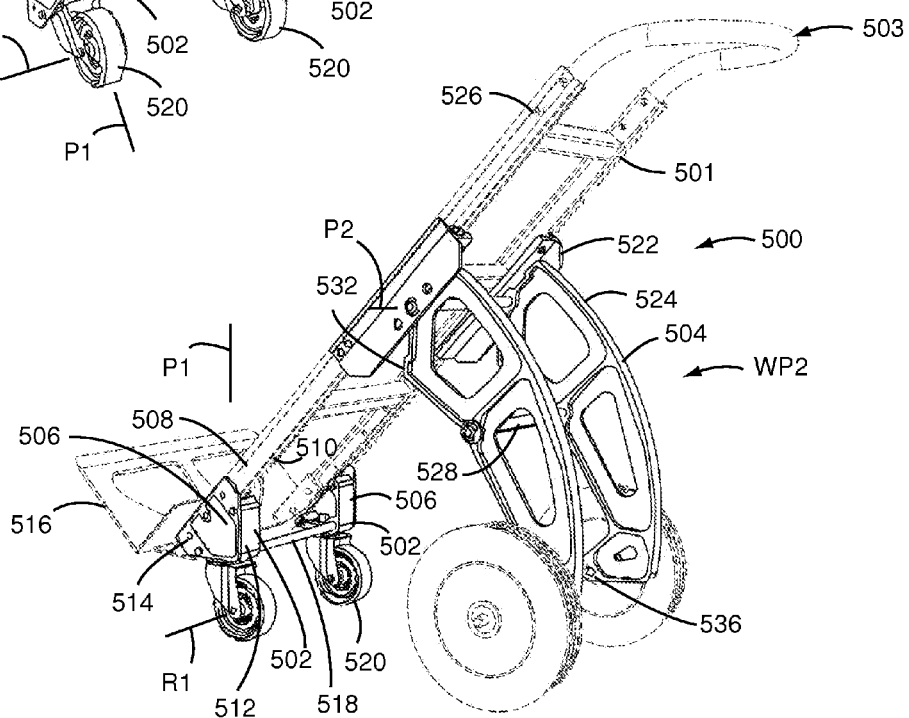
FIG. 21 is a perspective view showing the kit of FIG. 20 installed on a prior art hand truck chassis with the resulting modified hand truck in its long wheelbase use configuration.
Figure 22:
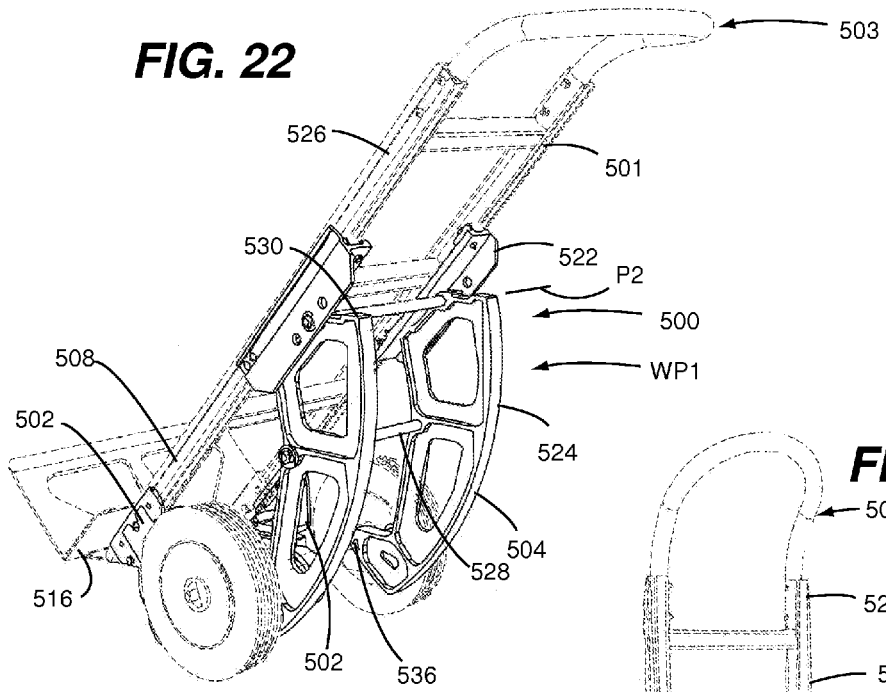
FIG. 22 is a perspective view showing the kit of FIG. 20 installed on a prior art hand truck chassis with the resulting modified hand truck in its short wheelbase use configuration.
Figure 23:
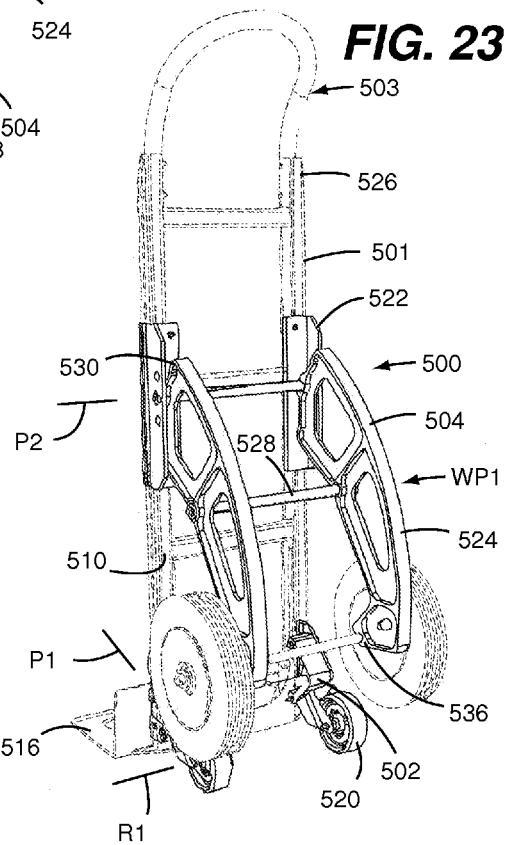
FIG. 23 is a perspective view showing the kit of FIG. 20 installed on a prior art hand truck chassis with the resulting modified hand truck in its vertical loading configuration.

Referring now to FIGS. 17-19, a wheeled apparatus 400 configured in accordance with a fourth embodiment of the present invention is shown. The underlying construction and functionality of the wheeled apparatus 400 is similar to that of the hand truck 300. However, the wheeled apparatus 400 includes a means for precluding the wheeled apparatus 400 from rolling freely when in a first wheelbase use configuration and for allowing the hand truck 400 to roll freely when in a second wheelbase use configuration.

A main frame 402 of the hand truck 400 includes stop structure 403. As shown, the stop structure 403 can be positioned at a first end portion 412 of the main frame 402 forward to front wheels 406 (e.g., first-size wheels) that are also attached to the first end portion 412 of the main frame 402. Alternatively, it is disclosed herein that the stop structure 403 can be positioned at a location between front wheels 406 and rear wheels 410 (e.g., second-size wheels). A subframe 408 is pivotably attached at its first end 426 to the main frame 402 at a position between the front wheels 406 and a second end portion 419 of the main frame 402. The rear wheels 410 are attached in a spaced apart arrangement to the subframe 408 at its second end portion 436 and rotate about a common rotational axis RA2 that extends substantially parallel with a subframe pivot axis PA2 about which the subframe 408 is pivotable.

The subframe 408 is pivotable about the pivot axis PA2 between a first subframe position P1 (FIG. 17) and a second subframe position P2 (FIGS. 18 and 19) with respect to the main frame 402. In a similar manner as for the hand truck 300, the subframe 408 and the main frame 402 jointly limit movement of the subframe 408 to be between the first subframe position P1 and second subframe position P2. As shown in FIG. 17, when the subframe 408 is in its first subframe position P1, the wheeled apparatus 400 is in a short wheelbase whereby the stop structure 403 and rear wheels 410 all simultaneously sit on a common reference plane RP1. As shown in FIGS. 18 and 19, when the subframe 408 is in its second subframe position P2, the wheeled apparatus 400 is in a long wheelbase whereby the front wheels 406 and the rear wheels 410 all simultaneously sit on the common reference plane RP1. In this manner, the wheeled apparatus 400 is precluded from freely rolling when in the short wheelbase use configuration and can be freely rolled when in its long wheelbase use configuration.

It is disclosed herein that the wheeled apparatus 400 can be configured for carrying a load for one or more specific types of intended uses. For example, the main frame 402 can include a load carrying structure that is specifically configured for carrying a particular type of load and/or article(s). In one specific example, the wheeled apparatus 400 can include one or more baskets attached to the main frame 402 for carrying articles such as groceries or other discrete items. In another specific example, the wheeled apparatus 400 can include one or more cradles attached to the main frame 402 for carrying cylindrical bodies such as gas cylinders. In view of the disclosures made herein, a skilled person will appreciate that the wheeled apparatus 400 is not unnecessarily limited to any particular type of application or use.

Turning now to FIGS. 20-23, a kit 500 configured in accordance with an embodiment of the present invention is shown. The kit 500 is intended for being installed on a main frame 501 of a prior art hand truck 503 (i.e., a prior art wheeled apparatus). In this manner, the kit 500 can be used for modifying a prior art hand truck to provide functionality in accordance with a wheeled apparatus configured in accordance with an embodiment of the present invention. It is disclosed that, as-installed, a kit configured in accordance with the present invention will result in a wheeled apparatus (e.g., a hand truck) offering functionality that is in accordance with the present invention. For example, the resulting wheeled apparatus will offer functionality as disclosed above in reference to FIGS. 1-19.

The kit 500 includes a set of first-size wheel assemblies 502 and a wheelbase varying assembly 504. Each one of the first-size wheel assemblies 502 has a mounting bracket 506 attachable to the main frame 501 at a first end portion 508 and on a rear side 510 of the main frame 501. The mounting bracket 506 can include a main body 512 and one or more flanges 514. The main body 512 and the one or more flanges 514 are each configured for being attached to a respective portion of the main frame 501 and/or optionally to a load support structure 516 of the prior art hand truck 503. A wheel assembly crossbar 518 can extend between the first-size wheel assemblies 502 for providing a unitized first-size wheel assembly.

Each one of the first-size wheel assemblies 502 includes a first-size wheel 520 that is pivotably attached to the mounting bracket 506 of the respective one of the first-size wheel assemblies 502. Each first-size wheel 520 is pivotably attached to the respective mounting bracket 506 in a manner permitting pivoting of the first-size wheel 520 about a pivot axis P1. Each first-size wheel is rotatable about a respective rotational axis R1. The pivot axis P1 extends substantially perpendicular to the rotational axis R1. The pivot axis P1 is substantially skewed with respect to a planar reference surface of the main body 512 that is configured to engage a mating surface defined by the rear side 510 of the main body 501. In this regard, the first-size wheels 520 can be that of a caster unit that is suitably configured for being attached to the mounting bracket 506.

The wheelbase varying assembly 504 includes spaced apart main frame mounting structures 522 and spaced apart wheel attachment structures 524 (i.e., spaced apart subframe members). Optionally, the wheelbase varying assembly 504 can include a pair of second-size wheels such as, for example, if wheels of the prior art hand truck 503 are not to be used with the wheelbase varying assembly 504. The main frame mounting structures 522 are each attachable to the main frame 501 at a location between its second end portion 526 and a mounting location of the first-size wheel assemblies 504. The wheel attachment structures 524 are each pivotably attached to a respective one of the main frame mounting structures 522 for allowing the wheel attachment structure to be pivoted about a subframe pivot axis P2. The wheel attachment structures 524 are each pivotable between a first wheelbase position WP1 (i.e., a first subframe position) and a second wheelbase position WP2 (i.e., a second subframe position) with respect to the respective main frame mounting structure 522. A subframe crossbar 528 can extend between the wheel attachment structures 524 for providing a unitized wheel attachment structure (i.e., a unitized subframe). A wheel attachment structure 536 is provided at the second end portion of each one of the wheel attachment structures 524 (e.g., a mount with an axle receiving passage).

Each one of the wheel attachment structures 524 can include travel limiting structures providing positive positioning of the wheel attachment structures 524 (with respect to the main frame 501 in response to rotation of the wheel attachment structures 524 about the subframe pivot axis p2. A first travel limiting structure 530 (e.g., an abutment portion) of each one of the wheel attachment structures 524 engages the respective main frame mounting structure 522 (and/or optionally the mainframe 501 itself) for maintaining the wheel attachment structures 524 in the first wheelbase position WP1. A second travel limiting structure 532 (e.g., an abutment portion) of each one of the wheel attachment structures 524 engages the respective main frame mounting structure 522 (and/or optionally the mainframe 501 itself) for maintaining the wheel attachment structures 524 in the second wheelbase position WP2.

In view of the disclosures made herein, a skilled person will appreciate that the main frame of a wheeled apparatus configured in accordance with the present invention can be configured for carrying objects such as, for example, groceries, welding tools, beverage cases, gas cylinders, luggage, gardening equipment or other articles. More specifically, in some instances, the main frame and/or the load platform of such a wheeled apparatus can be configured specifically for a particular type of load that the wheeled apparatus is configured for carrying. For example, in a wheeled apparatus specifically configured for carrying a gas cylinder, the main frame and the load platform can both be configured with a respective cradle structure for securely positioning a gas cylinder in place. In another example, a wheeled apparatus can include a main frame having a grocery carrying structure (e.g., one or more shelves or baskets) that are held in a suitable orientation for having groceries stowed therein when the main frame is in a use orientation (e.g., at an approximate 45 degree angle with respect to a horizontal support surface). It is disclosed herein that, in some implementations of a wheeled apparatus in accordance with the present invention, it will be desirable and/or advantageous for a wheelbase of the wheeled apparatus to be defined between a single caster and a pair of fixed-axis wheels (i.e., the second-size wheels disclosed above). It is also discussed herein that, in some implementations of a wheeled apparatus in accordance with the present invention, it will be desirable and/or advantageous for one or more casters to be attached to the subframe assembly and one or more fixed axis wheels to be attached to the main frame.

Certain terminology is used in the descriptions and/or disclosures made herein for convenience only and is not limiting. The words "right," "left," "lower" and "upper" designate directions in the drawings to which reference is made. The words "opened", "closed", "inwardly" and "outwardly" refer to directions toward and away from, respectively, the geometric center of the hand truck and designated parts thereof. The terminology includes the words above specifically mentioned, derivatives thereof and words of similar import. Additionally, the word "a," as used in the claims and the corresponding portions of the specification, means "at least one."

Based on the foregoing description, to those skilled in the art it would be obvious that the invention could be built with different materials and wheel configurations. The exact material and arrangement will vary based on the material be transported and the type of cart the invention is attached to. The methods of attaching the invention to the main frame can also vary, with the primary requirement that the attachment allows the subframe to pivot.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A kit for modifying a wheeled apparatus having a main frame and a load support structure attached to the main frame at a first end portion thereof such that the load support structure extends forward of a front side of the main frame, the kit comprising:
   a set of caster unit mounts each having a caster unit mounting structure and a main frame engaging structure attached to the caster unit mounting structure, wherein the main frame engaging structure is configured for being secured to at least one of the main frame and the load support structure;
   a set of caster units each having a mounting portion configured for being secured to the caster unit mounting structure of a respective one of the caster unit mounts such that a first-size wheel thereof is rotatable about of a rotational axis thereof and pivot about a pivot axis thereof, wherein the pivot axis extends substantially perpendicular to the rotational axis;
   a subframe mounting structure configured for being secured to the main frame; and
   a subframe having a first end portion thereof pivotably attached to the subframe mounting structure and a second end portion thereof having a second size wheel mounting structure integral therewith;
   wherein each one of the caster unit mounts and each one of the caster units are jointly configured such that, when the each one of the caster unit mounts is secure to the main frame and each caster units is secured to a respective one of the caster unit mounts, the pivot axis of each one of the caster units extends in a substantially skewed orientation with respect to a load support surface of load support structure;
   wherein each one of the caster unit mounts, each one of the caster units, the subframe mounting structure and the subframe are jointly configured such that, when the subframe mounting structure is secured to the main frame, each one of the caster unit mounts is secure to the main frame, and each caster units is secured to a respective one of the caster unit mounts, a first wheelbase length defined between the caster units and the second size wheel mounting structure of the subframe is provided when the subframe is in the first subframe position thereof;
   wherein each one of the caster unit mounts, each one of the caster units, the subframe mounting structure and the subframe are jointly configured such that, when the subframe mounting structure is secured to the main frame, each one of the caster unit mounts is secure to the main frame, and each caster units is secured to a respective one of the caster unit mounts, a second wheelbase length defined between the caster units and the second size wheel mounting structure of the subframe is provided when the subframe is in the second position thereof; and
   wherein the second wheelbase length is greater than the first wheelbase length.

2. The kit of claim 1 wherein:
   each one of the caster unit mounts, each one of the caster units, the subframe mounting structure and the subframe are jointly configured such that, when the subframe mounting structure is secured to the main frame, each one of the caster unit mounts is secure to the main frame, and each caster units is secured to a respective one of the caster unit mounts, a first wheelbase length defined between the caster units and the second size wheel mounting structure of the subframe is provided when the subframe is in the first subframe position thereof;
   each one of the caster unit mounts, each one of the caster units, the subframe mounting structure and the subframe are jointly configured such that, when the subframe mounting structure is secured to the main frame, each one of the caster unit mounts is secure to the main frame, and each caster units is secured to a respective one of the caster unit mounts, a second wheelbase length defined between the caster units and the second size wheel mounting structure of the subframe is provided when the subframe is in the second position thereof; and
   the second wheelbase length is greater than the first wheelbase length.

3. The kit of claim 2 wherein the first end portion of each one of the spaced apart subframe members includes:
   a first travel limiting structure that engages a respective one of the spaced apart subframe member mounting brackets for maintaining the subframe in a first subframe position with respect to the main frame; and
   a second travel limiting structure that engages the respective one of the spaced apart subframe member mounting brackets for maintaining the subframe in a second position with respect to the main frame.

4. The kit of claim 3 wherein:
   the subframe mounting structure includes spaced apart subframe member mounting brackets;
   the subframe includes spaced apart subframe members each having a first end portion thereof attached to a respective one of the spaced apart subframe member mounting brackets and a second end portion with a second size wheel mounting structure integral therewith;
   the first travel limiting structure includes a first abutment portion of each one of the spaced apart subframe members that engages a mating portion of a respective one of the spaced apart subframe member mounting brackets when the subframe is pivoted to the first subframe position; and the second travel limiting structure includes a second abutment portion of each one of the spaced apart subframe members that engages a mating portion of a respective one of the spaced apart subframe member mounting brackets when the subframe is pivoted to the second position.

5. A kit for modifying a wheeled apparatus having a main frame and a load support structure attached to a first end portion of the main frame such that the load support structure extends forward of a front side of the main frame, the kit comprising:

a first-size wheel assembly including a wheel assembly mounting structure having two first-size wheels attached thereto in a spaced apart arrangement, wherein the wheel assembly mounting structure is attachable to the main frame at the first end portion thereof such that the first-size wheels are located on a rear side of the main frame when the wheel assembly mounting structure is attached to the main frame, wherein the first-size wheels are each pivotably attached to the wheel assembly mounting structure for being pivoted about a pivot axis extending substantially perpendicular to a rotational axis of a respective one of the first-size wheels, and wherein the wheel assembly mounting structure is configured such that the pivot axis extends in a substantially skewed orientation with respect to a load support surface of the load support structure when the wheel assembly mounting structure is attached to the main frame; and a subframe assembly including a subframe mounting structure and a subframe pivotably attached at a first end portion thereof to the subframe mounting structure, wherein the subframe mounting structure is attachable to the main frame at a location between a second end portion thereof and a mounting location of the first-size wheel assembly and wherein the subframe is attached to the subframe mounting structure in a manner for allowing the subframe to be pivoted between a first subframe position and a second position when the subframe mounting structure is attached to the main frame.

6. The kit of claim 5 wherein:

the subframe and the subframe mounting structure jointly limit movement of the subframe to be between the first and second positions thereof;

the subframe engages a first mating portion of the subframe mounting structure when in the first subframe position thereof such that movement of the subframe terminates at the first subframe position thereof when sufficiently pivoted in a first pivot direction about a pivot axis of the subframe; and the subframe engages a second mating portion of the subframe mounting structure when in the second position thereof such that movement of the subframe terminates at the second position thereof when sufficiently pivoted in a second pivot direction about the pivot axis of the subframe.

7. The kit of claim 5 wherein:

the subframe includes a wheel mounting structure at a second end portion thereof;

the first-size wheel assembly and the subframe assembly are jointly configured such that, when the first-size wheel assembly and the subframe assembly are attached to the main frame, a first wheelbase length between the first-size wheels and the wheel mounting structure of the subframe is provided when the subframe is in the first subframe position thereof;

the first-size wheel assembly and the subframe assembly are jointly configured such that, when the first-size wheel assembly and the subframe assembly are attached to the main frame, a second wheelbase length between the first-size wheels and the wheel mounting structure of the subframe is provided when the subframe is in the second position thereof; and the second wheelbase length is greater than the first wheelbase length.

8. The kit of claim 5, further comprising:

at least one second-size wheel attached to the subframe at a second end portion thereof, wherein a maximum diameter of the at least one second-size wheel is equal to or greater than a maximum diameter of the first-size wheels.

9. The kit of claim 8 wherein:

the at least one second-size wheel being attached to the second end portion of the subframe includes a pair of second-size wheels attached in a spaced apart arrangement to the second end portion of the subframe;

the second-size wheels rotate about a common rotational axis extending substantially parallel with a pivot axis about which the subframe is pivotable; and a track width of the second-size wheels is greater than a track width of the first-size wheels.

10. The kit of claim 9 wherein:

the subframe and the subframe mounting structure jointly limit movement of the subframe to be between the first and second positions thereof with respect to the subframe mounting structure;

a first abutment portion of the subframe engages a first portion of the subframe mounting structure when in the first subframe position thereof such that movement of the subframe terminates at the first subframe position thereof when sufficiently pivoted in a first pivot direction about a pivot axis of the subframe; and a second abutment portion of the subframe engages a second portion of the subframe mounting structure when in the second position thereof such that movement of the subframe terminates at the second position thereof when sufficiently pivoted in a second pivot direction about the pivot axis of the subframe.

11. The kit of claim 10 wherein:

the first-size wheel assembly and the subframe assembly are jointly configured such that, when the first-size wheel assembly and the subframe assembly are attached to the main frame, a first wheelbase length between the first-size wheels and the second-size wheels is provided when the subframe is in the first subframe position thereof;

the first-size wheel assembly and the subframe assembly are jointly configured such that, when the first-size wheel assembly and the subframe assembly are attached to the main frame, a second wheelbase length between the first-size wheels and the second-size wheels is provided when the subframe is in the second position thereof; and the second wheelbase length is greater than the first wheelbase length.

12. The kit of claim 11 wherein:

the second-size wheels rotate about a rotational axis extending substantially parallel with a pivot axis about which the subframe is pivotable; and the first-size and second-size wheels all simultaneously sit on a common reference plane when the subframe is in the first subframe position thereof and simultaneously sit on the common reference plane when the subframe is in the second position thereof.

13. A kit for modifying a hand truck having a main frame and a load support structure attached to the main frame at a first end portion thereof such that the load support structure extends forward of a front side of the main frame, the kit comprising:
- a set of first-size wheel assemblies each having a mounting bracket attachable to the main frame at the first end portion thereof on a rear side of the main frame, wherein each one of the first-size wheel assemblies includes a first-size wheel that is pivotably attached to the mounting bracket of the respective one of the first-size wheel assemblies in a manner permitting pivoting thereof about a pivot axis extending substantially perpendicular to a rotational axis of the first size wheel; and
- a wheelbase varying assembly including a main frame mounting structure, a wheel attachment structure and a pair of second-size wheels, wherein the main frame mounting structure is attachable to the main frame at a location between a second end portion thereof and a mounting location of the first-size wheel assemblies, wherein the wheel attachment structure is pivotably attached to the main frame mounting structure for allowing the wheel attachment structure to be pivoted about a pivot axis thereof, wherein the second-size wheels are rotatably attached to a second end portion of the wheel attachment structure, wherein each one of the second size wheels has a maximum diameter equal to or greater than a maximum diameter of the first-size wheels and wherein the wheel attachment structure is pivotable between a first pivot position and a second position with respect to the main frame mounting structure of the wheelbase varying assembly.

14. The kit of claim 13 wherein the first-size wheel assemblies and the wheelbase varying assembly are jointly configured such that, when the first-size wheel assemblies and the wheelbase varying assembly are attached to the main frame, the second-size wheels rotate about a common rotational axis extending substantially parallel with the pivot axis about which the wheel attachment structure is pivotable.

15. The kit of claim 13 wherein:
- the first-size wheel assemblies and the wheelbase varying assembly are jointly configured such that, when the first-size wheel assemblies and the wheelbase varying assembly are attached to the main frame, the first-size wheels and the second-size wheels simultaneously sit on a common reference plane when the wheel attachment structure is in the first position thereof while the first-size wheels are in any pivoted position with respect to the pivot axis thereof; and
- the first-size wheel assemblies and the wheelbase varying assembly are jointly configured such that, when the first-size wheel assemblies and the wheelbase varying assembly are attached to the main frame, the first-size wheels and the second-size wheels simultaneously sit on the common reference plane when the wheel attachment structure is in the second position thereof while the first size wheels are in any pivoted position with respect to the pivot axis thereof.

16. The kit of claim 15 wherein:
- the first-size wheel assemblies and the wheelbase varying assembly are jointly configured such that, when the first-size wheel assemblies and the wheelbase varying assembly are attached to the main frame, a first wheelbase length between the first-size wheels and the second-size wheels is provided when the wheel attachment structure is in the first position thereof;
- the first-size wheel assemblies and the wheelbase varying assembly are jointly configured such that, when the first-size wheel assemblies and the wheelbase varying assembly are attached to the main frame, a second wheelbase length between the first-size wheels and the second-size wheels is provided when the wheel attachment structure is in the second position thereof; and
- the second wheelbase length is greater than the first wheelbase length.

17. The kit of claim 16 wherein the maximum diameter of the first-size wheels and the maximum diameter of the second-size wheels are jointly sized for allowing the first-size wheels to each be pivoted fully around the pivot axis of a respective one of the first size wheels without coming into contact with an adjacent one of the second-size wheels when the wheel attachment structure is in the first position thereof.

18. The kit of claim 17 wherein:
- the first-size wheel assemblies and the wheelbase varying assembly are jointly configured such that, when the first-size wheel assemblies and the wheelbase varying assembly are attached to the main frame, a first wheelbase length between the first-size wheels and the second-size wheels is provided when the wheel attachment structure is in the first position thereof;
- the first-size wheel assemblies and the wheelbase varying assembly are jointly configured such that, when the first-size wheel assemblies and the wheelbase varying assembly are attached to the main frame, a second wheelbase length between the first-size wheels and the second-size wheels is provided when the wheel attachment structure is in the second position thereof; and
- the second wheelbase length is greater than the first wheelbase length.

* * * * *